(12) United States Patent
Munno

(10) Patent No.: US 6,173,505 B1
(45) Date of Patent: Jan. 16, 2001

(54) MEASUREMENT AND MARKING TOOL

(76) Inventor: Anthony Munno, P.O. Box 23, Lewiston, NY (US) 14092

( * ) Notice: Under 35 U.S.C. 154(b), the term of this patent shall be extended for 0 days.

(21) Appl. No.: 09/127,206

(22) Filed: Jul. 31, 1998

(51) Int. Cl.[7] .................................................. G01B 3/10
(52) U.S. Cl. .............................. 33/761; 33/760; 33/768; 33/781
(58) Field of Search .............................. 33/755, 759–61, 33/768–70, 781, 782, 668, 480

(56) References Cited

U.S. PATENT DOCUMENTS

| | | | |
|---|---|---|---|
| 3,922,793 | * 12/1975 | Gandrud | 33/781 |
| 4,276,695 | * 7/1981 | Stansbury, Jr. | 33/781 |
| 4,642,898 | * 2/1987 | Miller | 33/761 |
| 4,700,489 | * 10/1987 | Vasile | 33/760 |
| 5,113,596 | * 5/1992 | Meyers | 33/759 |
| 5,390,425 | * 2/1995 | Gilberts | 33/760 |
| 5,406,711 | * 4/1995 | Graham | 33/760 |
| 5,782,007 | * 7/1998 | Harris | 33/768 |
| 5,782,728 | * 7/1998 | Morrison | 33/782 |
| 5,848,481 | * 12/1998 | Parsons et al. | 33/760 |

OTHER PUBLICATIONS

Toht, David W. "Basic Carpentry Techniques." Ortho Books, San Ramon, California, 1997, pp. 24–26, Dec. 1997.

* cited by examiner

Primary Examiner—Christopher W. Fulton
Assistant Examiner—Quyen Doan
(74) Attorney, Agent, or Firm—Simpson, Simpson & Snyder, L.L.P.

(57) ABSTRACT

A measurement and marking tool comprising a horizontal member having attachment means for securing a tape measure thereto, and a vertical member emanating from and arranged perpendicularly to the horizontal member. The tool is especially useful in measuring and marking stud placement in carpentry.

9 Claims, 7 Drawing Sheets

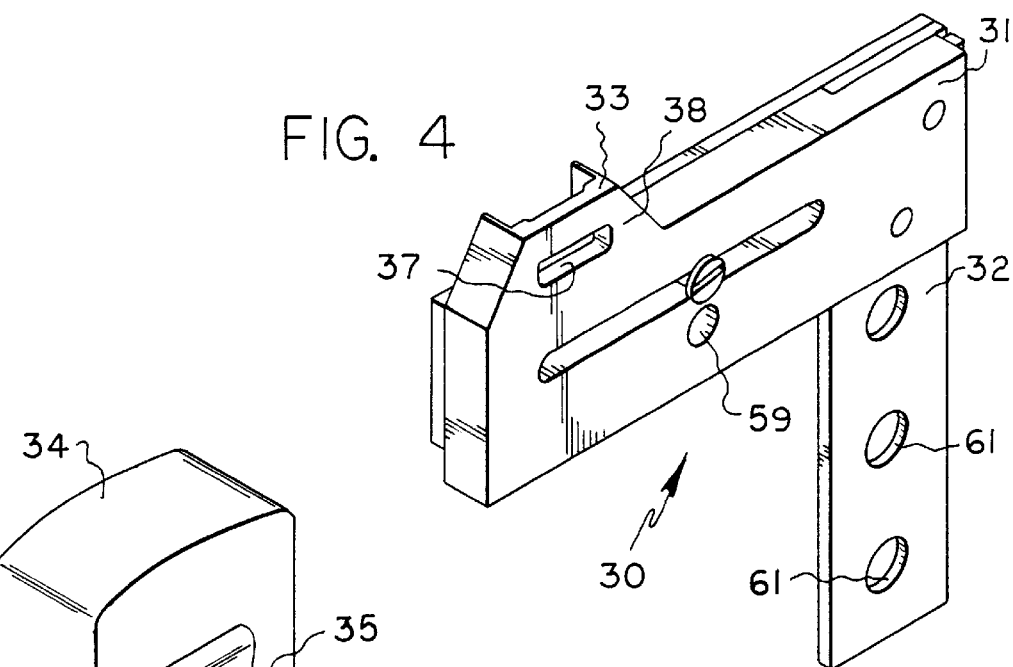
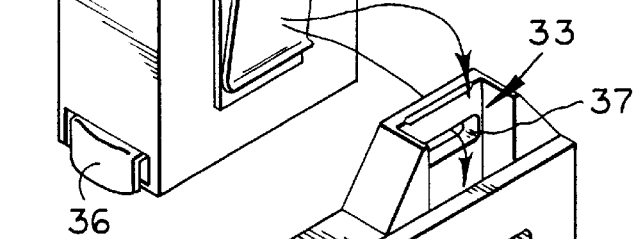
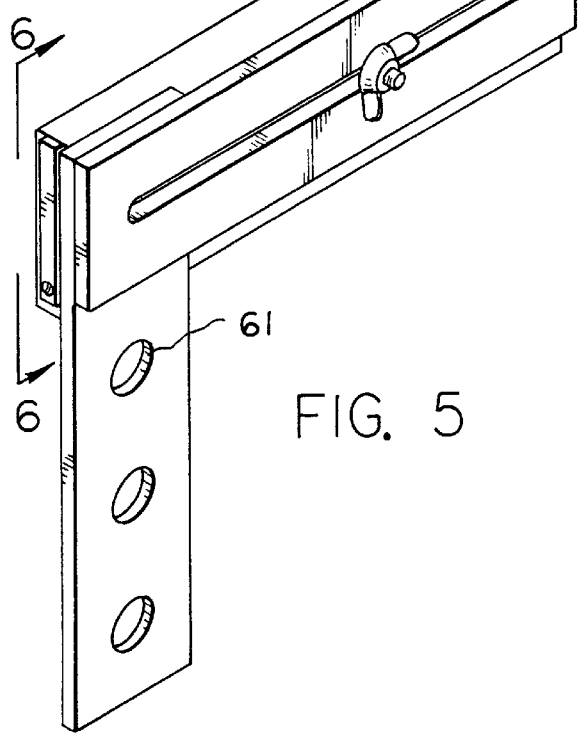
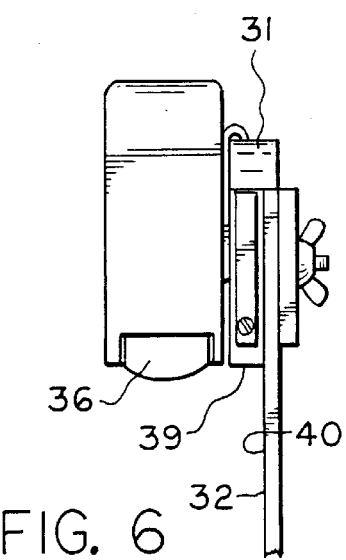
FIG. 4
FIG. 5
FIG. 6

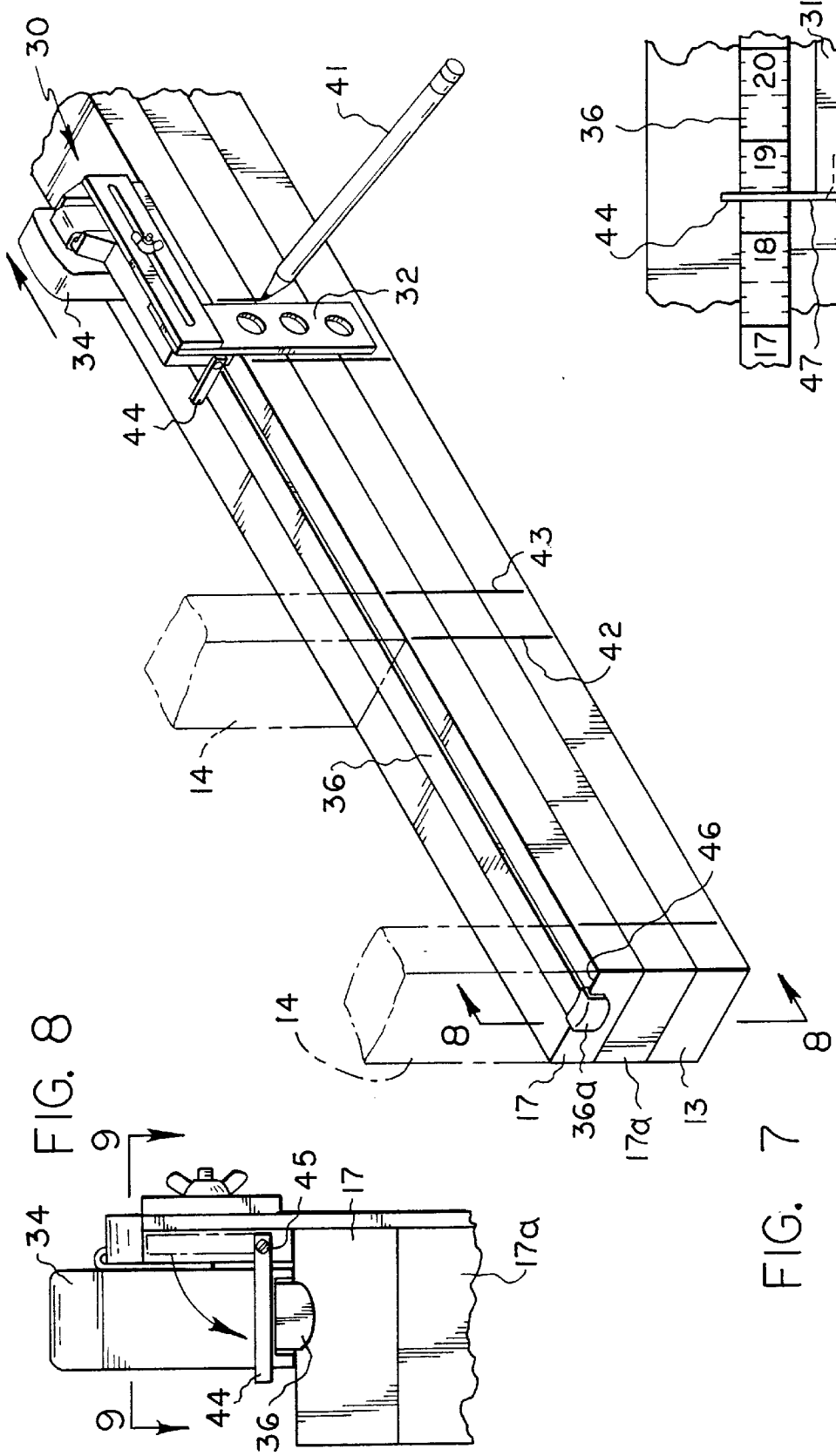

MEASUREMENT AND MARKING TOOL

FIELD OF THE INVENTION

This invention relates generally to carpentry, more specifically to tools for use in carpentry, and, even more specifically, to a measurement and marking tool for use in carpentry.

BACKGROUND OF THE INVENTION

As every carpenter knows, accurate measurement and marking is a critical part of any new construction. In building a house, for example, it is critical that the location of wall studs be accurately measured on the soleplate and top plate. In addition to accurate measurement, it is also important to mark stud placement on the soleplate and top plate, as well as an indication of the type of stud to be installed (e.g., normal stud, king stud, trimmer stud, cripple stud).

As we approach a new millennium, and despite the fact that millions of houses have been constructed to date in the United States and around the world, it is interesting to note that the basic method of measuring and marking soleplates and top plates for stud placement has changed very little over the years. Carpenters traditionally tack the soleplate and top plate together, and then use a tape measure, framing square and/or try square to measure and mark stud placement. Occasionally, a combination square, bevel square and/or protractor might also be used. Once the markings are made, the plates are separated, and the studs installed between the soleplate and top plate. In some localities an extra (or double) top plate is used.

In measuring and marking stud placements, most carpenters usually first run a tape measure along the entire length of the tacked soleplate/top plate where studs are to be placed. Normal studs are placed at 16" centers along the soleplate, although cripple studs (studs placed above or below a window, or above a door opening) or trimmer studs (studs used adjacent to door or window openings) may be placed closer together. After measuring, the carpenter will use a framing square or try square to draw straight lines to mark stud placement, and will also indicate with a specific marking what type of stud is to be installed. Thus, stud measuring and marking is presently a two-step process. To compound the problem, the carpenter must usually get down on his hands and knees, or at least bend at the waist, to mark the soleplate/top plate, as the plates are located at the foundation of the structure. Thus, the measurement and marking procedure is very labor-intensive. In addition, if a mistake is made during the process, then the entire two-step procedure must be re-done.

What is needed, then, is a better way to measure and mark stud placement in building construction, preferably a one-step method as opposed to the present two-step method, and preferably a method that is less labor-intensive for the carpenter. Obviously, a new tool is needed to implement the new method.

SUMMARY OF THE INVENTION

The present invention comprises a measurement and marking tool, having a horizontal member having attachment means for securing a tape measure thereto, and a vertical member emanating from and arranged perpendicularly to the horizontal member. When a tape measure is secured to the horizontal member of the tool, stud placement may be accomplished in a one-step continuous process. The invention further comprises an extension handle and writing instrument to enable the tool to be used by a carpenter while he is in a n upright (i.e., standing) position.

A principal object of the invention is to provide a measurement and marking tool that greatly simplifies the way in which measurement and marking is done in construction work.

A more specific object of the invention is to provide a measurement and marking tool that makes it much easier to measure and mark the locations of studs to be installed in a building under construction.

Another object of the invention is to provide a new method of measuring and marking stud placement in carpentry.

These and other object, features, and advantages of the present invention will become readily apparent to those having ordinary skill in the art upon a reading of the following detailed description of the invention, in view of the drawings and appended claims.

BRIEF DESCRIPTION OF THE DRAWINGS

FIG. 4 is a perspective view of a preferred embodiment of the present invention, taken from the front of the tool;

FIG. 5 is a perspective view of the tool shown in FIG. 4, taken from the back of the tool, and showing how a conventional tape measure is secured to the tool;

FIG. 6 is a fragmentary end view of the tool shown in FIG. 5, taken generally along line 6—6 in FIG. 5;

FIG. 7 is a perspective view which illustrates one way in which the tool may be used to measure and mark stud placement in a building under construction;

FIG. 8 is a fragmentary end view of the tool shown in FIG. 7, taken generally along line 8—8 in FIG. 7;

FIG. 7 is a fragmentary top view of the tool shown in FIG. 8, taken generally along line 9—9 in FIG. 8;

FIG. 8 is a perspective view of the back of the tool, illustrating operation of the angular marking member of the tool;

FIG. 9 is a fragmentary elevation of the tool shown in FIG. 8, illustrating in more detail how the angular marking member of the tool is used to measure and mark angular positions on an object;

DETAILED DESCRIPTION OF THE PREFERRED EMBODIMENT

At the outset, it should be understood and appreciated that the present invention is ideally suited for measurement and marking of studs in a stud wall under construction. However, this is but one application of the present invention. The tool described and claimed herein is useful in any application where measurement and marking is required. In the description that follows, the terms "soleplate", "base plate" and "bottom plate" are used interchangeably.

In constructing a house or other building, walls are usually constructed using studs, made of wood or metal. After the foundation is laid, and the subfloors are made and secured to the floor joists, construction of the walls begins. Layout of a stud wall proceeds in two stages. First, the wall locations are marked on the floor with chalk lines. Then the top and bottom plates are cut for each wall section and the locations of doors, windows, and studs are marked on them. In the United States, wood studs are usually made of 2×4 lumber. Studs generally extend between the top and bottom plates, except for cripple studs that extend between the top or bottom plates and a header for a window or door.

Prior to the present invention, the measuring and marking of stud locations was generally a two-step process. First, a carpenter would extend a tape measure along the bottom plate, marking stud locations every 16" (except for cripple studs, or trimmer studs for door or window openings). Next, the carpenter uses a framing square or try square to draw lines at the stud markings that are perpendicular to the plate to assure proper stud placement. This process is especially labor intensive because it usually requires the carpenter to get down on his hands and knees or to bend at the waist to make the measurements and markings, twice.

Figure 1:
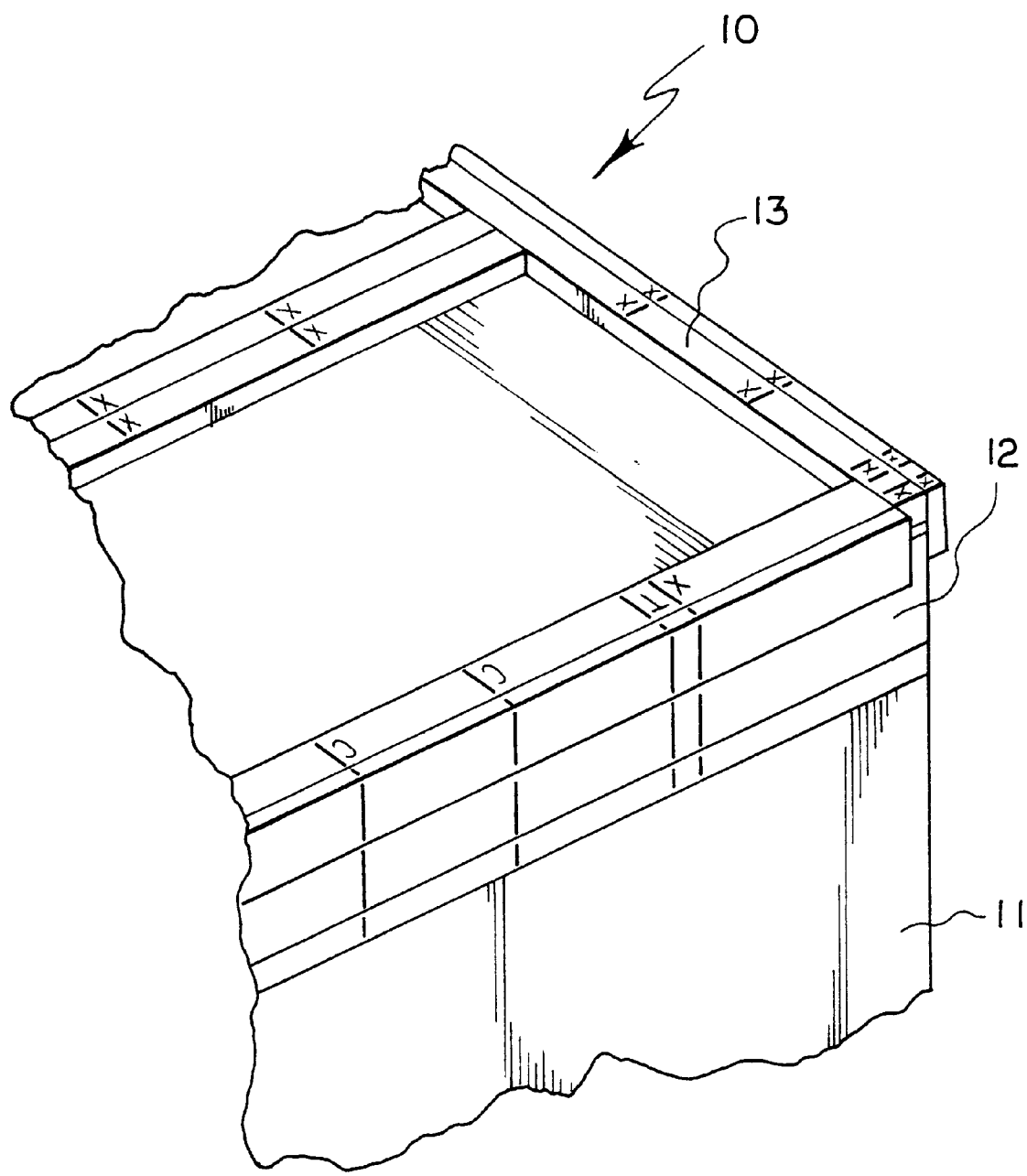
FIG. 1 is a perspective view of a corner of a structure under construction about to be measured and marked for stud placement.

Adverting now to the drawings, FIG. 1 illustrates in fragmentary perspective view the corner 10 of a building under construction. The building comprises a foundation 11 made of cinder blocks. Atop the foundation are mounted a mud sill (not shown), girders (not shown) and floor joists 12. Base plate 13 is secured to the floor joists about the periphery of the building.

Figure 2:
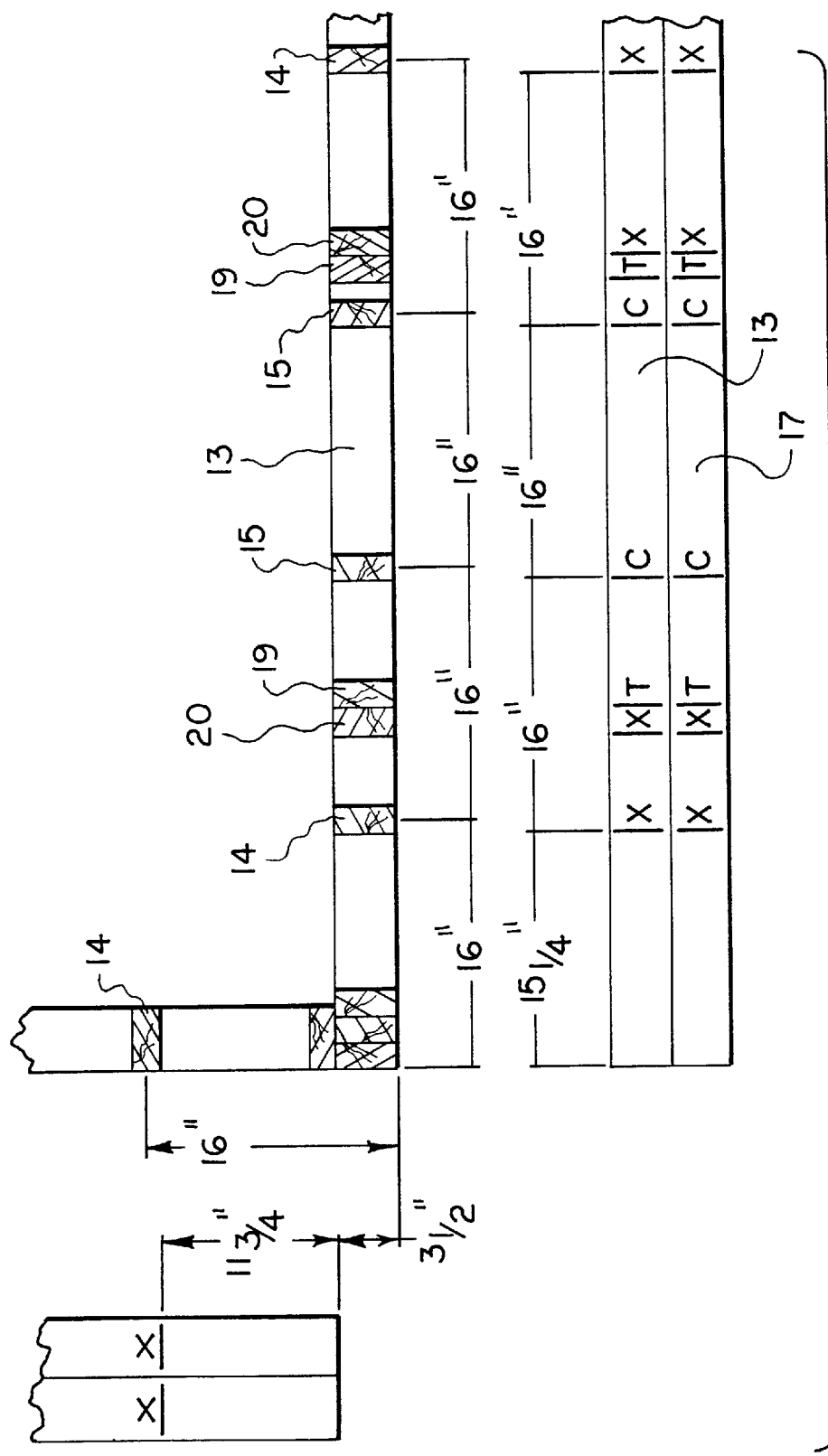
FIG. 2 illustrates in detail how top and bottom plates are measured and marked for stud placement.

FIG. 2 is a plan view that illustrates in detail how the bottom plates are measured and marked for stud placement. As shown in the drawings, studs 14 are generally placed along base plate 13 at a distance of 16" apart on center. Since a stud is ¾" thick, the first measurement and marking is made at a distance of 15¼" from the end of the base plate. Additional markings are made at 16" intervals from the first marking. In addition to the measurements, it is also necessary to draw a "squaring line" on the base plate, which line is perpendicular to the base plate itself. These squaring lines are used to align the studs properly on the base plate.

Figure 3:
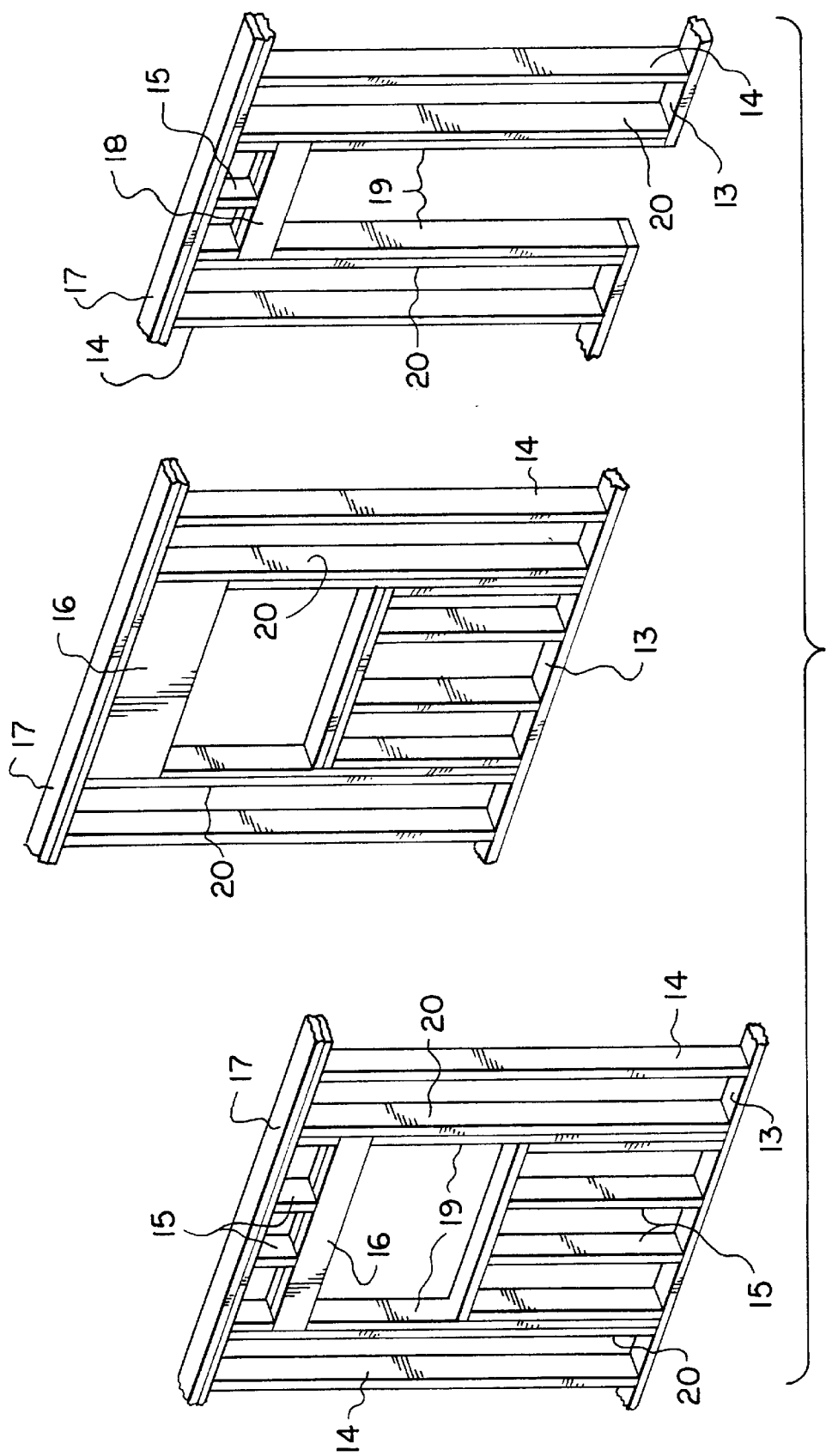
FIG. 3 is a perspective view of three configurations of stud walls to illustrate the different types of studs to be placed in construction of such a wall.

The base plate is further marked with a suitable symbol or indicia to indicate the side of the line where the stud is to be mounted, and the type of stud to be mounted as well. The finished stud wall is shown in perspective view in FIG. 3. Adverting now to both FIGS. 2 and 3, an "X" to the right of a squaring line indicates that the stud is a standard stud 14, and that the stud is to be mounted to the right of the squaring line. Other designations include "C" for a cripple stud 15, which is a stud that extends from the base plate to a header 16 for a window opening (or from the top plate 17 to a header 18 for a door or window), and "T" for a trimmer stud (indicated by reference number 19 in FIG. 3), which is a stud placed adjacent a king stud 20 (a standard stud) in framing a door or window.

Measuring and marking tool 30 is illustrated in perspective view (from the front of the tool) in FIG. 4. Tool 30 comprises horizontal member 31 and vertical member 32. Horizontal member 31 contains attachment means 33 for securing a tape measure 34 (shown in FIG. 5) to the tool.

Although the horizontal and vertical members are shown in the drawing figures as separate members secured to one another, it should be appreciated that the tool could be constructed as a unitary, integral unit.

FIG. 5 illustrates the tool in perspective view from the back of the tool. This view illustrates how tape measure 34 is secured to the tool in a preferred embodiment. Tape measure 34 includes a clip 35 fixedly secured to the housing of the tape measure. Attachment means 33 comprises a recess in horizontal member 31 and also includes an aperture 37 in wall 38 of horizontal member 31. Clip 35 is a spring-loaded clip that slides over wall 38 and snaps in place in aperture 37. It should be appreciated that the preferred embodiment is but one way in which the tape measure may be secured to the tool. Obviously, the tool could be affixed or secured in any number of ways. In fact, the tool could be an integral part of the tool itself.

FIG. 6 is a fragmentary end view of the tool with the tape measure affixed, taken generally along line 6—6 in FIG. 5. Tape 36 of tape measure 34 is shown to be parallel to and co-planar with bottom planar surface 39 of the horizontal member. Surface 39 is also shown to be perpendicular to planar surface 40 of vertical member 32. Since, in operation, surface 39 is in contact with and slidingly engages the object to be marked, it is important that tape 36 is co-planar with surface 39 to ensure accurate measurement.

Operation of the tool is illustrated in perspective view in FIG. 7, where tool 30 is being used to measure and mark stud locations along three plates 17, 17a and 13 that have been tacked is together. Tape 36 is secured by its end tab 36a to corner 46 of plate 17. As the tool and attached tape measure travel rightwardly, the tape extends from the tape measure. As shown in the drawing, pencil 41 is used to draw straight lines along both sides of vertical member 32 onto the sides of the plates, marking the precise placement of studs 14. For example, lines 42 and 43 drawn on plates 17, 17a and 13 define where a stud is to be placed. These lines are also precisely measured as the tool progresses along the plates. For example, the tool could be used to accurately mark stud placement every 16" on center. This precise measurement is accomplished in part by gauge member 44 which is pivotally secured to horizontal member 31 by screw 45 (shown in FIGS. 7, 8 and 9). As shown in FIG. 8, gauge member 44 pivots downwardly so as to be positioned just above the tape and parallel thereto. As best shown in FIG. 9, surface 47 of gauge member 44 is co-planar with surface 40 of vertical member 32, assuring accurate measurement. The measurement indicia of tape 36 are easily read with the assistance of gauge member 44.

Figure 10:
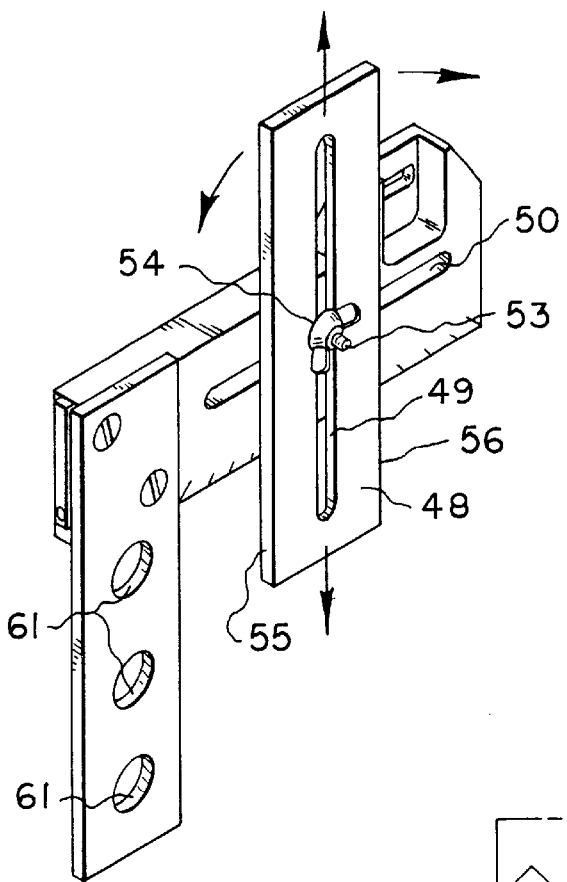
Figure 11:
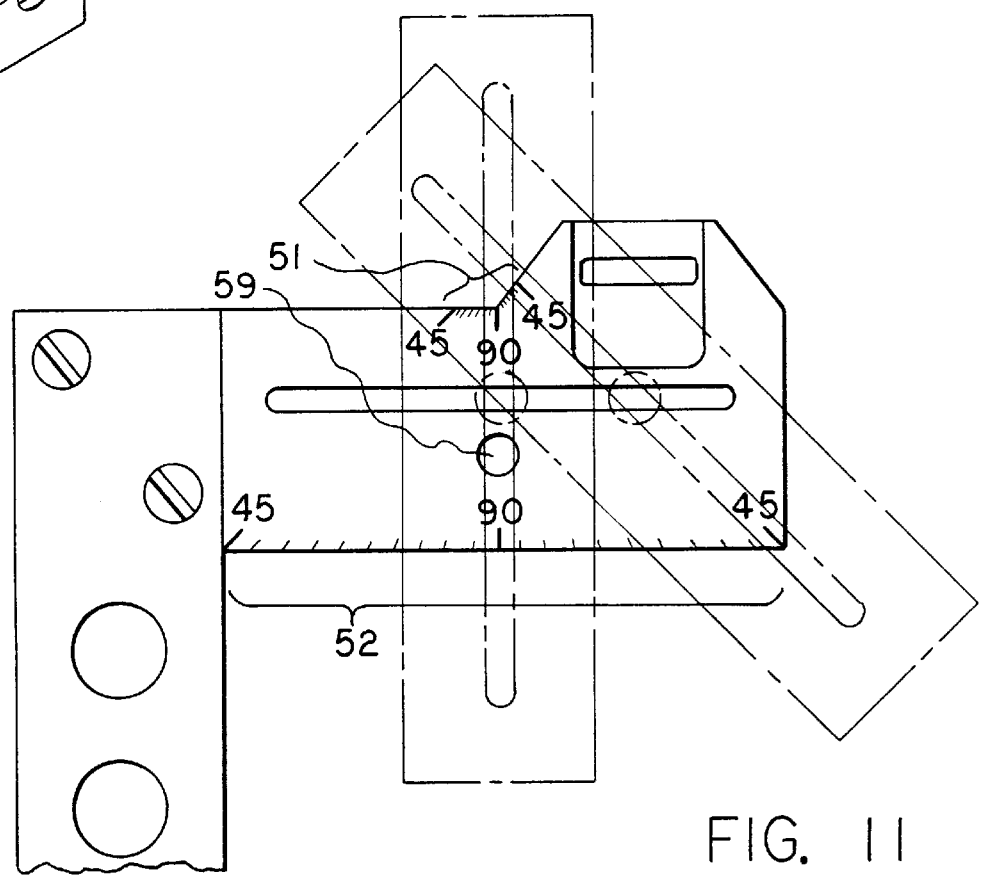

Occasionally, it is necessary for a carpenter to measure and mark angular lines and locations on a workpiece. To accomplish this task, tool 30 further comprises angular marking member 48. The structure and operation of the angular marking member is best understood with reference to FIGS. 10 and 11. As shown in FIG. 10, angular marking member 48 comprises a generally rectangular plate having a longitudinal slot 49 therein. The plate is secured to horizontal member 31 by bolt 53 and wing nut 54. The bolt passes through slot 50 in horizontal member 31 and slot 49 in angular marking member 48. The bolt slidingly engages both slots 49 and 50. In addition, angular marking member 48 is arranged for rotation about the bolt. Angular marking member 48 has two straight edges 55 and 56, parallel to one another, and suitable for marking objects with angular indications. As shown in FIG. 11, horizontal member 31 contains angular indicia 51 and 52. To make an angular measurement and marking, one rotates angular marking member 48, aligning the angular number indicia within slot 49. For example, in FIG. 11, the member is aligned to make a 45° angle measurement. Once the member is aligned, the carpenter can mark an object by drawing a line along edge 55 or 56.

Figure 12:
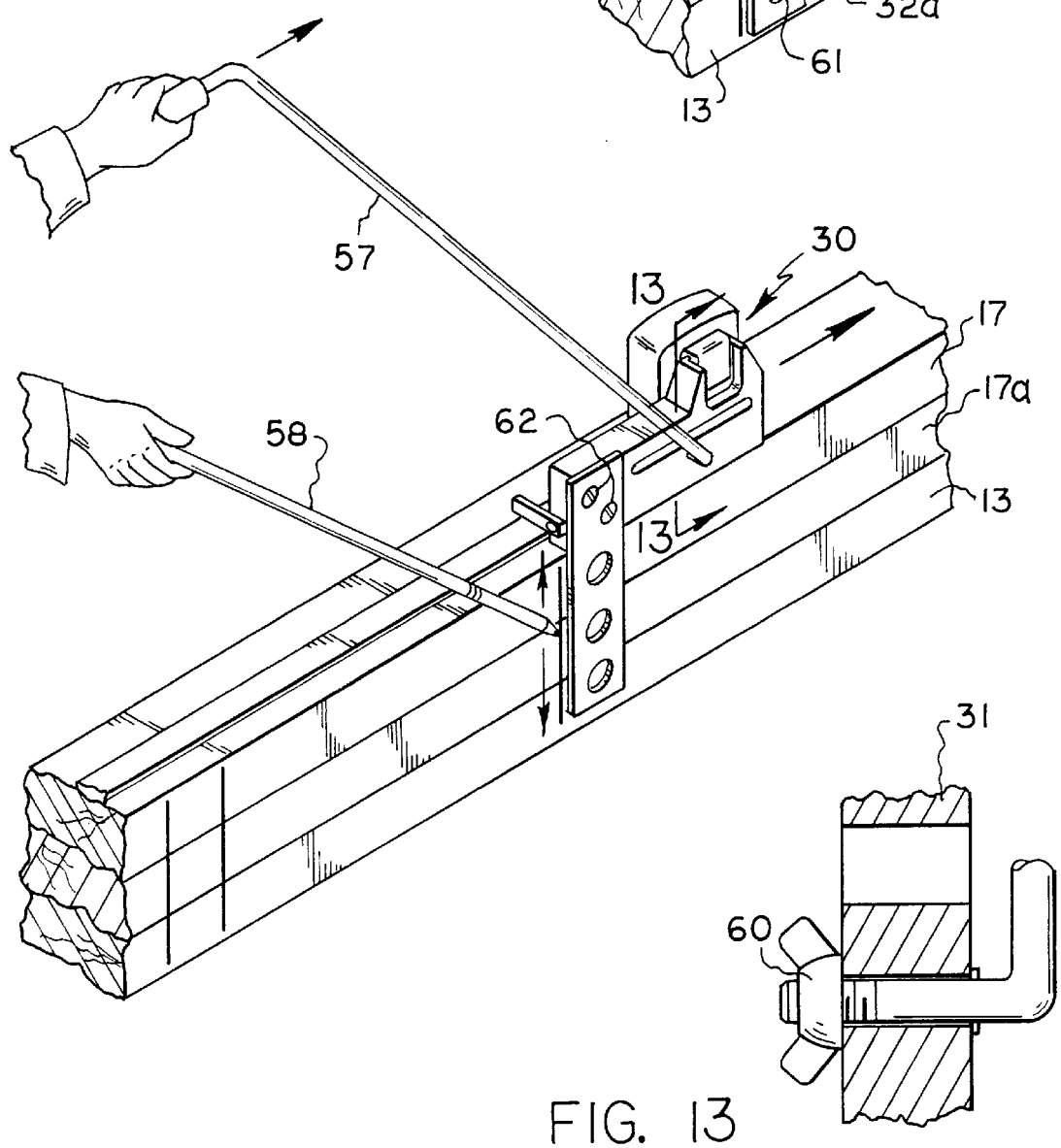
FIG. 12 is a perspective view illustrating use of the extension handle and long writing instrument in pushing the tool along a soleplate to be measured and marked.
Figure 13:
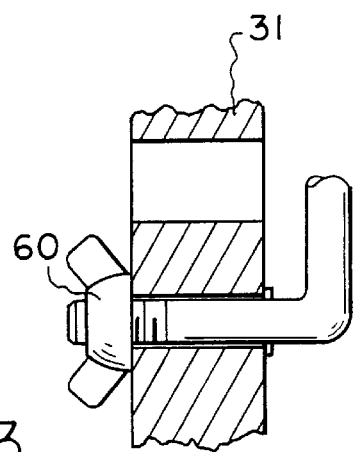
FIG. 13 is a fragmentary cross-sectional view taken generally along line 13—13 in FIG. 12, illustrating how the extension handle is secured to the horizontal member of the tool in a preferred embodiment; and, FIG. 14 is a perspective view of a second embodiment of the tool having a shorter vertical member.

FIG. 12 illustrates use of the measurement and marking tool. In this embodiment, tool 30 is being pushed along plate 17 by extension handle 57, and the measurements and squaring lines are being marked by writing instrument 58, in this case a long pencil. The extension handle is pivotally secured to horizontal member 31 through through-bore 59 (shown in FIG. 11). The end of extension handle 57 is threaded and the handle is secured to the horizontal member by wing nut 60, as best shown in FIG. 13. Obviously, this is but one way in which the extension handle may be affixed to the tool. The advantage of this embodiment is that the carpenter can remain standing as he marks the plates.

Figure 14:
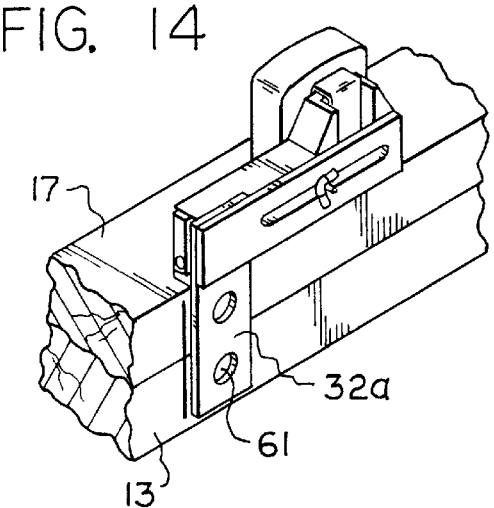

In some construction practice, the top and bottom plates are tacked together for measurement and marking, as illustrated in FIGS. 7, 12 and 14. In some areas of the country, a single bottom plate is used, and two top plates are used, as illustrated in FIGS. 7 and 12. In other areas a single top and bottom plate are used, as illustrated in FIG. 14. In the case illustrated in FIG. 14, vertical member 32 has been replaced by vertical member 32a, which is shorter than vertical member 32. It should be appreciated that both vertical members may be easily attached or detached from the tool by way of mounting screws 62 (shown in FIG. 12). It should also be appreciated that both vertical members contain apertures 61. Member 32 contains three apertures 61, whereas member 32a contains two apertures. These apertures may be used to place a suitable indicia on the object being marked. For example, the object may be marked to show what type of stud is being marked (normal, king, trimmer, cripple, etc.).

Thus, it is seen that the objects of the invention are efficiently obtained. It should be appreciated by those having ordinary skill in the art that the present invention may be used to measure and mark any number of objects, and is not limited to the stud wall application described herein. In fact, the present invention is not limited in its use to carpentry applications. Modifications and improvements in the invention should be readily apparent to those having ordinary skill in the art. For example, one obvious embodiment of the invention envisioned and contemplated by the inventor is the simple combination of a tape measure fixedly secured to a conventional try square. This ingenious yet simple and extremely useful device has apparently never heretofore been contemplated by those having ordinary skill in the art.

What I claim is:

1. A measurement and marking tool, comprising:

a horizontal member having attachment means for securing tape measure thereto, wherein said horizontal member comprises a first longitudinal slot, said tool further comprising an angular marking member, said angular marking member comprising a second longitudinal said horizontal member and said angular marking member pivotally and slidingly secured to one another by attachment means which passes through said first longitudinal slot and said second longitudinal slot, wherein said horizontal member further comprises angular indicia thereon, said indicia readable through said second longitudinal slot, and indicative of angular displacement of said angular marking member with respect to said horizontal member; and, a vertical member emanating from and arranged perpendicularly to said horizontal member.

2. A measurement and marking tool as recited in claim 1, wherein the tape of said tape measure is disposed parallel to said horizontal member when said tape measure is secured thereto.

3. A measurement and marking tool as recited in claim 1 wherein said attachment means comprises a recessed compartment in said horizontal member, operatively arranged to engage a clip of said tape measure.

4. A measurement and marking tool as recited in claim 1, further comprising a gauge is member secured to said tool and extending perpendicularly from said horizontal member and perpendicularly from said vertical member, said gauge extending transversely across said tape of tape measure when said tape is extended, enabling a clear visual indication of measurement indicia on said tape.

5. A measurement and marking tool as recited in claim 4 wherein said gauge member has an edge, and said edge is coplanar with a corresponding first edge of said vertical member to enable accurate marking of a line along said edge of said vertical member corresponding to said edge of said gauge.

6. A measurement and marking tool as recited in claim 5 wherein said vertical member has a width between said first edge and a second edge, and wherein said width is exactly the same as a thickness of a stud to be aligned and placed in a structure being built, such that a first line drawn on a plate along said first edge, and a second line drawn on said plate along said second edge will precisely demarcate where said stud should be placed.

7. A measurement and marking tool as recited in claim 1 further comprising an extension handle securable to said tool and operatively arranged to be used to push said tool along an object to be measured and marked.

8. A measurement and marking tool as recited in claim 7 further comprising a writing instrument having a length of at least twelve inches, for marking an object being measured and marked by said tool.

9. A measurement and marking tool as recited in claim 8 wherein said writing instrument is a pencil.

* * * * *